Aug. 19, 1958  H. E. INGERSOLL  2,847,800
AUTOMATIC GRINDER FOR TUNGSTEN CARBIDE DRILL BITS
Filed Nov. 28, 1955  2 Sheets-Sheet 1

Howard E. Ingersoll
INVENTOR.

Aug. 19, 1958  H. E. INGERSOLL  2,847,800
AUTOMATIC GRINDER FOR TUNGSTEN CARBIDE DRILL BITS
Filed Nov. 28, 1955  2 Sheets-Sheet 2

Howard E. Ingersoll
INVENTOR.

BY *Clarence A. O'Brien*
*and Harvey B. Jackson*
Attorneys

United States Patent Office 2,847,800
Patented Aug. 19, 1958

2,847,800

AUTOMATIC GRINDER FOR TUNGSTEN CARBIDE DRILL BITS

Howard E. Ingersoll, Carson City, Nev.

Application November 28, 1955, Serial No. 549,269

4 Claims. (Cl. 51—32)

This invention relates in general to new and useful improvements in tool sharpening devices, and more specifically to an automatic grinder for tungsten carbide drill bits.

A primary object of this invention is to provide an improved drill grinder which is particularly adapted for grinding tungsten carbide drill bits, the grinder being so constructed whereby a grinding wheel is simultaneously reciprocated, oscillated and moved transversely of the path of reciprocation whereby the desired shape is ground on a tip of a drill bit.

Another object of this invention is to provide an improved drill grinder for use in grinding tungsten carbide drill bits, the grinder including a suitable base having carried thereby a drill positioning device, there also being carried by the base a mechanism including a rotatable grinding wheel, the mechanism including means for moving the grinding wheel while being rotated to conform to the desired shape of the drill bit.

Still another object of this invention is to provide an improved drill grinder for tungsten carbide drill bits, the drill grinder including a suitable mechanism for effecting the movement of a grinding wheel in a desired path, and means for initially positioning the grinding wheel with respect to the tip of the carbide drill to be sharpened.

A further object of this invention is to provide an improved drill grinder which includes a support arm having a clamp for suitably clamping a grinding tool of the type including a self-contained motor and a rotatable drill grinding wheel, the support arm having connected thereto suitable means for effecting actuation thereof for moving the grinding wheel in a desired path with respect to a drill bit being ground.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
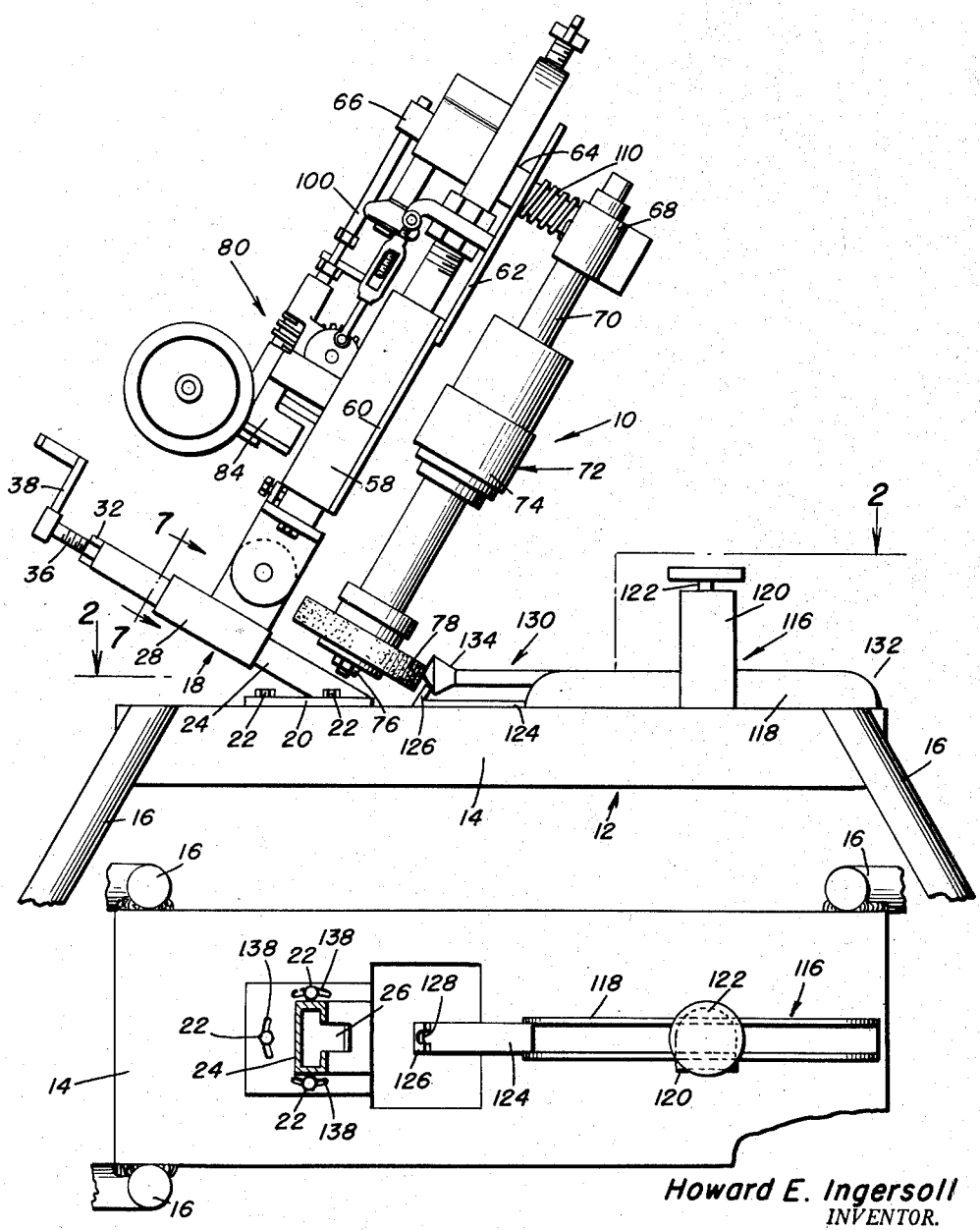
Figure 1 is a side elevational view of the drill grinder which is the subject of this invention and shows the same in the process of grinding the tip of a tungsten carbide drill bit.
Figure 2 is a horizontal sectional view taken substantially upon the plane indicated by the section line 2—2 of Figure 1 and shows the general details of the support for the drill bit, the drill bit being omitted and the details of a mounting bracket on the support assembly for the grinder.

Referring now to the drawings in detail, it will be seen that there is illustrated the automatic grinder which is the subject of this invention, the grinder being referred to in general by the reference numeral 10. The grinder 10 includes a suitable base which is referred to in general by the reference numeral 12. The base 12 includes a table 14 which is supported by diverging pairs of legs 16 disposed at opposite ends thereof.

Figure 7:
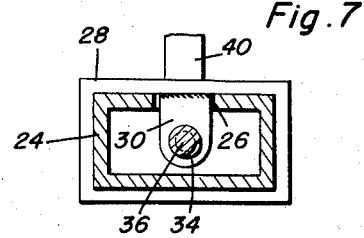
Figure 7 is an enlarged transverse sectional view taken substantially upon the plane indicated by the section line 7—7 of Figure 1 and shows further the details of the mounting bracket assembly.

Carried by the upper surface of the table 14 adjacent one end thereof is a mounting bracket assembly which is referred to in general by the reference numeral 18. The mounting bracket assembly 18 includes a mounting plate 20 which is suitably secured to the upper surface of the table 14 by means of fasteners 22. Extending upwardly and to the left from the plate 22, as viewed in Figure 1, is a support bar 24. The support bar 24 is generally rectangular in cross section and is of a hollow construction, as is best illustrated in Figure 7. Formed in the upper surface of the support bar 24 is an elongated slot 26.

Slidably received on the support bar 24 is a slide member 28. The slide member 28 is of the same general configuration as the support bar 24 and is guidingly received thereover. The slide member 28 is provided with a depending lug 30 which passes downwardly into the interior of the support bar 24 through the slot 26.

Rotatably journalled in an upper end of and passing downwardly into the interior of the support bar 24 is a threaded shaft 36. The shaft 36 is threadedly engaged in a threaded bore 34 in the lug 30 so that when the shaft 36 is rotated, the slide member 28 is moved along the support bar 24. Carried by the upper end of the threaded shaft 36, as is viewed in Figure 1, is a crank 38 to facilitate rotation of the shaft 36. Also, there is provided a lock nut 32 to retain the shaft 36 in an adjusted position.

Figure 3:
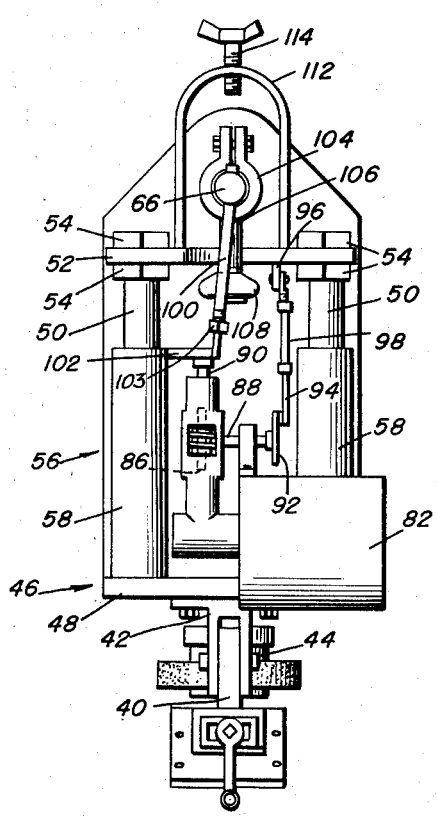
Figure 3 is a generally vertical view taken from the left, as illustrated in Figure 1, along a line normal to the general axis of the grinder and shows the specific details of the grinder and the means for actuating the same.
Figure 4:
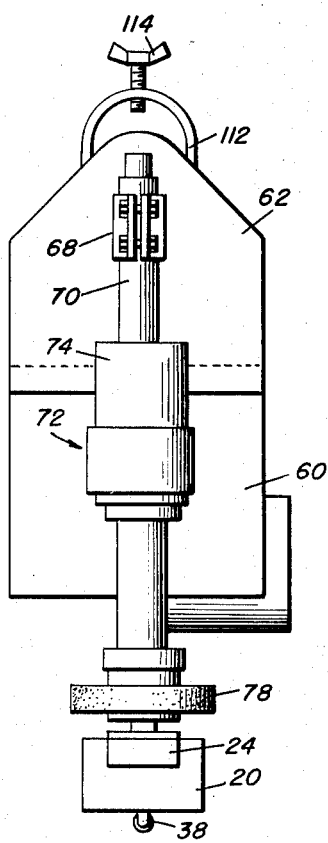
Figure 4 is a view similar to Figure 3 looking from the right and shows further the details of the grinder and the manner in which a grinding tool is removably carried by a grinder support arm.

Extending upwardly from the slide member 28 normal to the axis of the support bar 24 is a mounting lug 40, as is best illustrated in Figure 3. The mounting lug 40 has received thereover a bifurcated fitting 42, the fitting 42 being pivotally connected to the mounting lug 40 by means of a pivot bolt 44.

The mounting bracket assembly 18 is a part of a support assembly which is referred to in general by the reference numeral 46. The support assembly 46 also includes a base member 48 which has secured to the underside thereof the bifurcated fitting 42. Extending upwardly from the base member 48 is a pair of guide members 50 whose upper ends are connected together by a transverse bar 52. The bar 52 is clamped to the guide members by means of suitable nuts 54.

Slidably carried on the guide members 50 for reciprocatory movement therealong is a carriage which is referred to in general by the reference numeral 56. The carriage 56 includes a pair of sleeves 58 slidably received on the guide members 50. The sleeves 58 are connected together by a plate 60 which is best illustrated in Figure 1. Extending upwardly from the plate 60 is a second plate 62 which is also best illustrated in Figure 1.

Secured to the upper portion of the plate 62 and extending to the left therefrom, as is best illustrated in Figure 1, is a journal 64. The journal 64 has mounted therein for pivotal movement an elongated grinder support arm 66. The support arm 66 extends through the journal 64 and projects to the left thereof, as viewed in Figure 1. The grinder support arm 66 also extends to the right of the journal 64, as viewed in Figure 1, passes through the plate 62 and extends a considerable distance therefrom. Carried by the right end of the grinder support arm 66 is an adjustable clamp 68 in which there is releasably received a handle 70 of a self-contained grinder unit which is referred to in general by the reference numeral 72. The grinder unit 72 includes a suitable motor 74, which may be either air or electrical powered, and which includes a drive shaft 76. Carried by the drive shaft 76 for rotation therewith is a grinding wheel 78.

In order to properly grind a drill bit which will be described in more detail hereinafter, it is necessary that in addition to rotating, the grinding wheel 78 be generally vertically reciprocated, moved transversely to its direction of reciprocation, and be oscillated about an axis normal to the direction of reciprocation. In order to accomplish all of this, there is provided a suitable drive assembly which is referred to in general by the reference numeral 80.

The drive assembly 80 includes an electric motor 82 which is secured to one of the sleeves 58 by means of a suitable bracket 84. Connected to the electric motor 82 is a right angled gear box 86. The gear box 86 includes a first drive shaft 88 which is disposed parallel to the shaft of the electric motor 82, and a second drive shaft 90 which is disposed parallel to the axes of the guide members 50.

Carried by the free end of the drive shaft 88 is a pitman wheel 92 having connected thereto a pitman arm 94. The pitman arm 94 has the opposite end thereof connected to a lug 96 depending from the bar 52. The pitman arm 94 is adjustable in length and includes a central turnbuckle member 98. As the electric motor 82 rotates to drive the shaft 88, the pitman wheel 92 is rotated. Inasmuch as one end of the pitman arm 98 is anchored to the bar 52, the carriage 56 is reciprocated upwardly and downwardly on the guide members 50.

Rigidly carried by the left end of the grinder support arm 66, as viewed in Figure 1 and best shown in Figure 3, is an arm 100 which is of the desired length. The lower end of the arm 100 is connected by a ball and socket connection 103 to a cam wheel 102 carried by a free end of the shaft 90. As the wheel 102 rotates, the arm 100 is oscillated to effect the oscillatory movement of the grinder support arm 66.

Clamped over the journal 64 is a clamp 104 which forms a support bracket for a depending support 106. Mounted on the lower end of the support 106 is a cam 108. The cam 108 is formed by a suitable ball bearing and is so positioned so as to engage the central portion of the arm 100. The cam 108 is vertically adjustable relative to the support 106 to vary the effect thereof. As the arm 100 is rotated by the wheel 102, it rides on the cam 108 to effect longitudinal movement of the grinder support arm 66 through the journal 64.

Carried by that portion of the grinder support arm 66 and disposed to the right of the plate 62, as viewed in Figure 1, is a spring 110. The spring 110 is anchored both to the plate 62 and the clamp 68 and resists both oscillatory movement of the grinder support arm 66 and longitudinal movement thereof through the journal 64.

Extending upwardly from the bar 52 is an inverted yoke 112. The yoke 112 has carried by the upper portion thereof a screw 114. This screw 114 is utilized for the purpose of removably mounting a suitable cover (not shown).

Carried by the upper surface of the table 14 in alignment with the mounting bracket assembly 18 is a drill bit support 116. The drill bit support 116 includes an upwardly opening elongated channel shaped member 118 in which a shaft portion of a drill bit is received. Extending upwardly on opposite sides of the channel shaped member 118 at the center portion thereof is an inverted yoke 120. Extending downwardly from the yoke 120 is a clamp screw 122 engaging the shaft of the drill bit to clamp it in place.

The channel shaped member 118 includes an extension web 124 which terminates at the left end thereof, as viewed in Figure 1, in an upwardly reversely turned flange 126. The flange 126, as viewed in Figure 2, includes a central notch 128 for receiving a drill bit tip.

Figure 6:
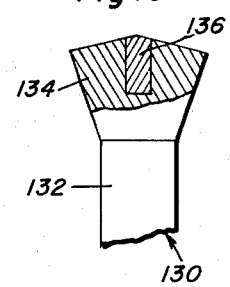
Figure 6 is an enlarged transverse view of the tip of the drill bit of Figure 5 with portions shown in section in order to specifically illustrate the details of the carbide insert thereof.
Figure 5:
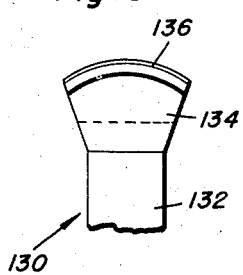
Figure 5 is a top plan view of a tip of a drill bit showing the desired curvature of the sharpened edge thereof.

Referring now to Figures 1, 5 and 6, it will be seen that there is illustrated a conventional drill bit for which the present invention is intended, the drill bit being referred to in general by the reference numeral 130. The drill bit 130 includes an elongated shank 132 of any desired length. Carried by the shaft 132 at one end thereof is a tip 134 of a desired configuration, the tip 134 being larger than the shank 132. The tip 134 includes a transversely disposed insert 136 which is formed of tungsten carbide. The tungsten carbide insert 136 projects outwardly of the remainder of the tip 134 and forms the main cutting portion thereof.

In order to effect the proper alignment of the grinding wheel 78 with the tip 134, the plate 20 is provided with arcuate slots 138. The arcuate slots 138 receive the fasteners 22 and permits the shifting of the entire grinder with respect to the table 14 and the drill mounting device 116.

When it is desired to sharpen a drill bit, such as the drill bit 130, the shank 132 thereof is positioned in the channel shaped member 118 in the manner best illustrated in Figure 1. The tip 134 is seated with respect to the flange 126 by insertion in the notch 128. One-half of the tip 134 is then ready for grinding utilizing the grinding wheel 78. The grinding wheel 78 is properly aligned with respect to the tip 134 by the various adjustments described above. The grinding wheel 78 is fed into the tip 134 by means of the threaded shaft 36. After one-half of the tip 134 has been sharpened, the tip 134 is reversed and the other half is sharpened as is necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drill grinding fixture comprising a base, drill positioning means carried by said base, a support assembly carried by said base adjacent said drill positioning means, a carriage mounted on said support assembly for reciprocatory movement, a grinder support arm supported by said carriage for pivotal movement and movement longitudinally of the longitudinal axis of said grinder support arm, and drive means connected to said carriage for simultaneously effecting reciprocation of said carriage and oscillation and longitudinal movement of said grinder support arm relative to said carriage.

2. A drill grinding fixture comprising a base, drill positioning means carried by said base, a support assembly carried by said base adjacent said drill positioning means, a carriage mounted on said support assembly for reciprocatory movement, a grinder support arm supported by said carriage for pivotal movement and movement longitudinally of the longitudinal axis of said grinder support arm, and drive means connected to said carriage for simultaneously effecting reciprocation of said carriage and oscillation and longitudinal movement of said grinder support arm relative to said carriage, said drive means including a cam wheel, an arm rigidly connected to said grinder support arm and connected to said cam wheel.

3. A drill grinding fixture comprising a base, drill positioning means carried by said base, a support assembly carried by said base adjacent said drill positioning means, a carriage mounted on said support assembly for reciprocatory movement, a grinder support arm supported by said carriage for pivotal movement and movement longitudinally of the longitudinal axis of said grinder support arm, and drive means connected to said carriage for simultaneously effecting reciprocation of said carriage and oscillation and longitudinal movement of said grinder support arm of, relative to said carriage, said drive means including a cam wheel, an arm rigidly connected to said grinder support arm and connected to said cam wheel, a cam carried by said carriage intermediate said grinder support arm and said cam wheel, said arm having an intermediate portion engaged with said cam whereby said arm is pivoted about said cam to effect said longitudinal movement.

4. A drill grinding fixture comprising a grinder, a base, drill positioning means carried by said base for fixedly positioning a drill, a support assembly carried by said base adjacent said drill positioning means, a carriage mounted on said support assembly for reciprocatory movement generally toward and away from said base, a grinder support arm supported by said carriage for pivotal movement about an axis normal to the direction of movement of said carriage, means supporting said grinder on said grinder support arm in depending relation, said grinder having an axis intersecting the longitudinal axis of said grinder support arm, said grinder support arm being mounted in said carriage for movement longitudinal of said grinder support arm, and drive means connected to said carriage and said grinder support arm for simultaneously effecting reciprocation of said carriage, said grinder support arm and said grinder and oscillation and longitudinal movement of said grinder support arm and said grinder relative to said carriage.

References Cited in the file of this patent

UNITED STATES PATENTS

| 1,698,909 | Currier | Jan. 15, 1929 |
| 1,759,196 | Jackson | May 20, 1930 |

FOREIGN PATENTS

| 702,293 | Great Britain | Jan. 13, 1954 |